United States Patent
Trudeau

(10) Patent No.: US 10,471,663 B2
(45) Date of Patent: Nov. 12, 2019

(54) BONDING PREPARATION PATCH

(71) Applicant: SIKORSKY AIRCRAFT CORPORATION, Stratford, CT (US)

(72) Inventor: Allen E. Trudeau, Manchester, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 100 days.

(21) Appl. No.: 15/557,183

(22) PCT Filed: Mar. 10, 2016

(86) PCT No.: PCT/US2016/021783
§ 371 (c)(1),
(2) Date: Sep. 11, 2017

(87) PCT Pub. No.: WO2016/149036
PCT Pub. Date: Sep. 22, 2016

(65) Prior Publication Data
US 2018/0043624 A1    Feb. 15, 2018

Related U.S. Application Data

(60) Provisional application No. 62/133,649, filed on Mar. 16, 2015.

(51) Int. Cl.
*B29C 65/48* (2006.01)
*B33Y 50/00* (2015.01)
*B29C 64/386* (2017.01)
*B29C 65/00* (2006.01)
(Continued)

(52) U.S. Cl.
CPC ............ *B29C 65/48* (2013.01); *B29C 64/386* (2017.08); *B29C 66/0222* (2013.01); *B29C 66/30322* (2013.01); *B29C 66/721* (2013.01); *B29C 66/73161* (2013.01); *B29C 66/73755* (2013.01); *B33Y 50/00* (2014.12); *B64C 1/061* (2013.01); *B29C 66/71* (2013.01);
(Continued)

(58) Field of Classification Search
CPC ........................................................ B29C 65/48
USPC ........................................................ 428/121
See application file for complete search history.

(56) References Cited

U.S. PATENT DOCUMENTS 2,569,954 A    10/1951    Ruebensaal
4,783,362 A    11/1988    Thornton et al.
(Continued)

FOREIGN PATENT DOCUMENTS

WO    1998022069 A1    5/1998

OTHER PUBLICATIONS

PCT/US2016/021783 ISR/WO, dated Jun. 2, 2016, 16 pages.

*Primary Examiner* — Brent T O'Hern
(74) *Attorney, Agent, or Firm* — Cantor Colburn LLP

(57) ABSTRACT

A bonding preparation patch for application to a resin treated surface is provided. The patch includes a strip having first and second portions, each of which has corresponding first and second sides. The strip is formed of resin porous material and is foldable such that the respective first sides of the first and second portions face each other. The patch further includes a resin barrier interposable between corresponding portions of the respective first sides and a tape including at least one adhesive side, which is securable relative to the first portion and disposable in contact with the second side of the second portion.

12 Claims, 4 Drawing Sheets

(51) Int. Cl.
*B64C 1/06* (2006.01)
*B29L 31/30* (2006.01)

(52) U.S. Cl.
CPC ... *B29C 66/7212* (2013.01); *B29L 2031/3076* (2013.01); *B29L 2031/3088* (2013.01)

(56) References Cited

U.S. PATENT DOCUMENTS

| | | | | |
|---|---|---|---|---|
| 6,827,893 | B2 * | 12/2004 | Clune | A44B 18/0049 24/442 |
| 9,473,459 | B2 * | 10/2016 | Zhao | H04W 76/10 |
| 2013/0129957 | A1 * | 5/2013 | Zhao | H04W 76/10 428/40.1 |
| 2013/0280488 | A1 | 10/2013 | Flinn | |
| 2015/0056433 | A1 | 2/2015 | MacAdams et al. | |

\* cited by examiner

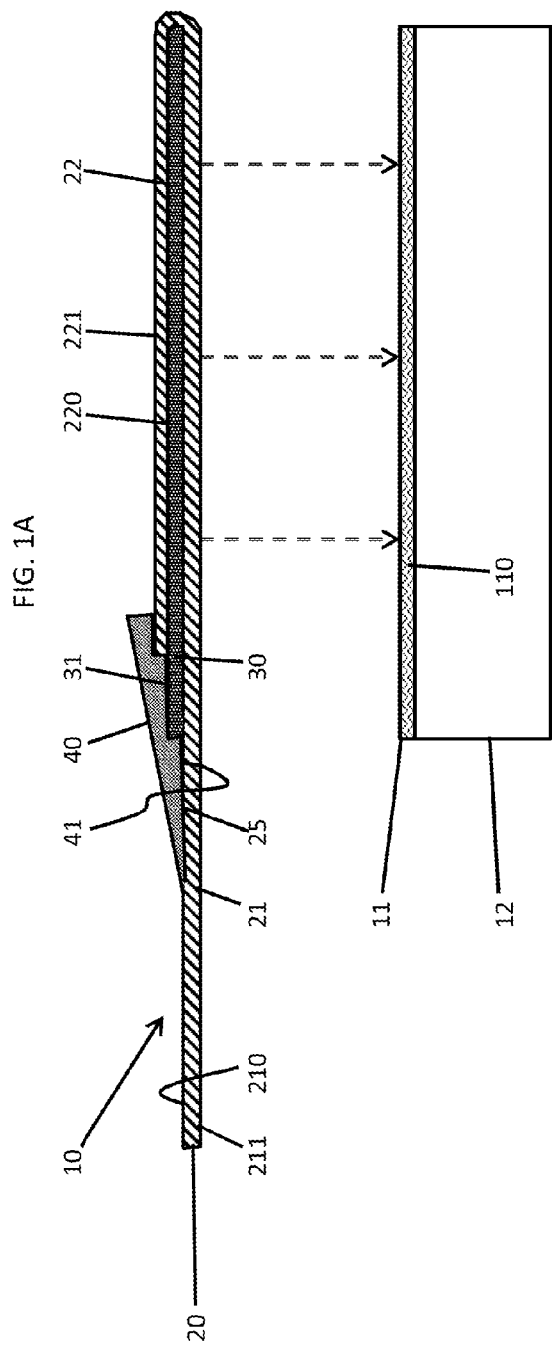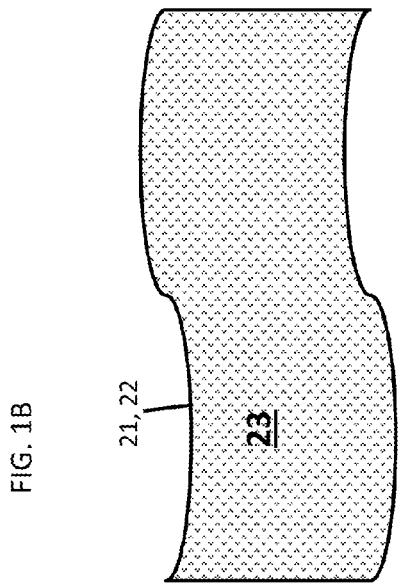

BONDING PREPARATION PATCH

CROSS REFERENCE TO RELATED APPLICATIONS

This application is a National Stage application of PCT/US2016/021783, filed Mar. 10, 2016, which claims the benefit of U.S. Provisional Application No. 62/133,649, filed Mar. 16, 2015, both of which are incorporated by reference in their entirety herein.

BACKGROUND OF THE INVENTION

The subject matter disclosed herein relates to a bonding patch for providing a matte surface and, more particularly, to a bonding patch and method for using a bonding patch for an attachment to a treated surface of aircraft components.

Current airframe fabrication techniques involve the successive layering of laminates, which include carbon and fiberglass such as Aramid (Kevlar™), and which are bonded to one another by resins. When the laminates are coated with the resin, which is liquid and sticky in its uncured form, and heated, a strong bond between the laminates is achieved with the resin coated surface forming a non-sticky generally smooth surface.

In the particular instance wherein the laminates are bonded to form an airframe, such as that of an airplane or helicopter, there exists the further need to attach infrastructure to the sides of the airframe including the hardened laminate structures. For example, it is common to run electrical wiring around and along the surface structure of an airframe and to bond clips or other holding devices to the surface of the airframe through which a continuous electrical network may be run. However, in order to bond a clip or other holding device to the relatively smooth surface of the heat treated resin coated laminate, it is necessary to treat the surface so as to form a matte or otherwise non-smooth, abrasive surface in order to enhance the bonding ability of whatever glue or bonding material is used to attach the clip or other holding device to the epoxy resin coated surface.

It is both time and effort consuming to machine, or otherwise fashion, a matte surface onto the airframe after it has been assembled. In addition, post assembly, access to the surfaces in need of a matte finish may be obstructed.

BRIEF DESCRIPTION OF THE INVENTION

According to one aspect of the invention, a bonding preparation patch for application to a resin treated surface is provided. The patch includes a strip having first and second portions, each of which has corresponding first and second sides. The strip is formed of resin porous material and is foldable such that the respective first sides of the first and second portions face each other. The patch further includes a resin barrier interposable between corresponding portions of the respective first sides and a tape including at least one adhesive side, which is securable relative to the first portion and disposable in contact with the second side of the second portion.

In accordance with additional or alternative embodiments, the resin porous material has a sufficient tensile strength to resist tearing upon separation from the resin treated surface.

In accordance with additional or alternative embodiments, the resin porous material is patterned as a negative of a desired pattern of surface features of the resin treated surface.

In accordance with additional or alternative embodiments, the resin porous material is configured to modify the surface features of the resin treated surface to have a bondability value of at least 10 inch-pounds/inch of width.

In accordance with additional or alternative embodiments, the resin porous material is patterned to mechanically modify the surface features of the resin treated surface.

In accordance with additional or alternative embodiments, the resin porous material is configured to chemically modify the resin treated surface.

In accordance with additional or alternative embodiments, the resin porous material includes woven material.

In accordance with additional or alternative embodiments, the resin barrier is flush with edges of the strip.

In accordance with additional or alternative embodiments, the resin barrier includes a non-bonding film material that forms a resin barrier and withstands cure temperatures.

In accordance with additional or alternative embodiments, the resin barrier includes a third portion of the strip.

In accordance with additional or alternative embodiments, the tape withstands cure temperatures.

In accordance with additional or alternative embodiments, the at least one adhesive side is disposable to contact the first side of the first portion.

In accordance with additional or alternative embodiments, digital representations formatted to be readable by a 3D printer, which, when acted upon by the 3D printer, cause the 3D printer to 3D print the strip, the resin barrier and the tape.

According to another aspects of the invention, an airframe is provided and includes a structural component having a surface, resin disposed on the surface to form a resin treated surface and a bonding preparation patch for application to the resin treated surface such that once the resin is cured the resin treated surface is pattern imprinted and possessed of a bondability value of at least 10 inch-pounds/inch of width. The patch includes a strip having first and second portions, each of which has corresponding first and second sides, the strip being formed of resin porous material, and foldable such that the respective first sides of the first and second portions face each other. The patch further includes a resin barrier interposable between corresponding portions of the respective first sides and a tape including at least one adhesive side, which is securable relative to the first portion and disposable in contact with the second side of the second portion.

According to yet another aspect of the invention, a method of forming an airframe is provided and includes resin treating a surface, forming a strip of resin porous material into a first portion and a second portion, applying the first portion to the resin treated surface, securably folding the second portion toward the first portion with a resin barrier interposed between the first and second portions, curing the resin treated surface and removing the strip from the cured surface.

In accordance with additional or alternative embodiments, the forming of the strip and the securably folding of the second portion toward the first portion are conducted prior to the resin treating of the surface.

In accordance with additional or alternative embodiments, the securably folding includes taping the second portion to the first portion.

In accordance with additional or alternative embodiments, the removing includes unsecuring the second portion from the first portion, unfolding the second portion away from the first portion and lifting the first portion away from the cured surface.

In accordance with additional or alternative embodiments, the resin porous material has a sufficient tensile strength to resist tearing upon separation from the resin treated surface.

In accordance with additional or alternative embodiments, the resin porous material includes woven material.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1A is a side view of a bonding preparation patch in accordance with embodiments;

FIG. 1B is a top down view of a portion of the bonding preparation patch of FIG. 1;

The detailed description explains embodiments of the invention, together with advantages and features, by way of example with reference to the drawings.

DETAILED DESCRIPTION OF THE INVENTION

As will be described below, a bonding preparation patch is provided and is formed of a strip of porous, woven material that is folded to form a flap with the non-flap portion laid generally flat against a resin surface. As a result, the resin soaks into, and partially through, the portion of the material laid flat against the resin. A barrier is provided to separate the flap and non-flap portions of the material which serves to prevent the resin from soaking through to the flap portion. The flap is then pressed flat and secured through the use of tape.

Once the resin is heat treated to become non-sticky, the tape may be removed exposing the flap portion of the material. By pulling on the flap, the non-flap portion of the material may be separated from the underlying resin treated surface. With the strip removed, the area of contact between the material and the resin treated surface exhibits a matte surface owing to the surface characteristics of the material which has been imprinted upon the resin treated surface. Such a bonding preparation patch may be distributed at any place about a resin treated surface and left in place until the resin treated surface has been assembled into an airframe or other structure.

Figure 2:
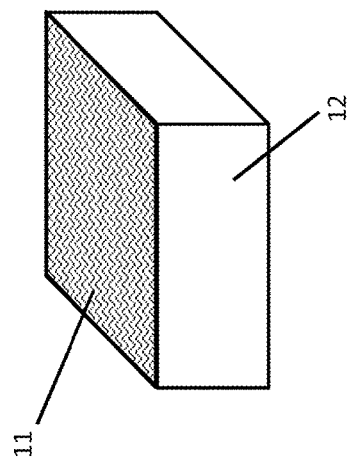
FIG. 2 is a perspective view of an initial stage of a bonding preparation method in accordance with embodiments.

With reference to FIGS. 1A and 1B and to FIGS. 2-7, a bonding preparation patch 10 is provided for application to, for example, a resin treated surface 11 of an airframe component 12 of an aircraft. The airframe component 12 may be any component of the aircraft (e.g., structural or otherwise). The patch 10 includes a strip 20. The strip 20 has a first portion 21 that has first and second opposite sides 210, 211 and a second portion 22 that also has first and second opposite sides 220, 221. As shown in FIG. 2, the strip 20 may be initially planarized such that the respective first sides 210 and 220 are co-planar and the respective second sides 211 and 221 are also co-planar. The strip 20 is disposable on the resin treated surface 11 such that the second side 211 of the first portion 21 impinges on the resin treated surface 11 and the first side 210 faces away from the resin treated surface 11.

The strip 20 is formed of resin porous material, such as a woven fabric material 23. This material 23 has a pattern that is defined as a negative of a desired pattern that is to be imprinted on the resin treated surface 11 (e.g., a matte finish so that the material 23 has to have a negative of a matte finish or a matrix of square or polygons so that the material 23 has to have a cross-linked, weave pattern). That is, once the strip 20 is disposed on the resin treated surface 11, the resin 110 provided thereon in an uncured, liquid and sticky form seeps or leaks through the first portion 21 of the strip 20 from the second side 211 to the first side 210. In doing so, the resin 110 assumes the negative (or imprinted or reverse) pattern of the material 23 pattern.

It is to be understood that the material 23 pattern and the chemistry of the resin and the material 23 can be variable for different applications and combinations.

Figure 4:
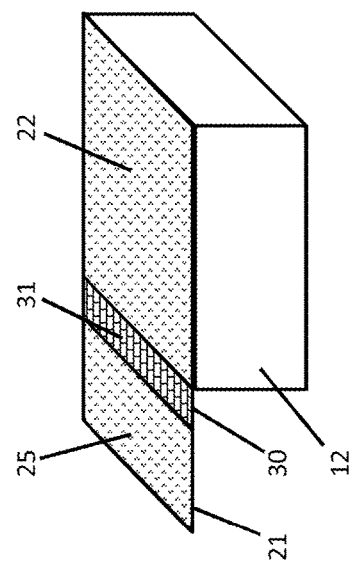
FIG. 4 is a perspective view of an intermediate stage of a bonding preparation method in accordance with embodiments.

As shown in FIGS. 1 and 3-5, the strip 20 further includes a resin barrier 30 and a tape 40 and is foldable along fold 24 such that the respective first sides 210 and 220 of the first and second portions 21 and 22 face each other with the resin barrier 30 interposable between corresponding portions of the respective first sides 210 and 220. The resin barrier 30 may be formed of fluorinated ethylene propylene (FEP) or another similar material such that the presence of the resin barrier 30 prevents the resin 110 that has seeped or leaked through the first portion 21 from seeping or leaking from the first side 210 of the first portion 21 to any part of the second portion 22. Edges of the resin barrier 30 may be flush with corresponding edges of the strip 20 as shown in FIG. 4 however this is not necessary and, in some embodiments, the edges of the resin barrier 30 extend beyond the edges of the strip 20 or terminate short of the edges of the strip 20.

The tape 40 secures the second portion 22 in the folded condition with the resin barrier 30 in place. The application of the tape 40 can also serve as the application of force necessary to cause the resin 110 to seep or leak through the first portion 21 of the strip 20.

Figure 3:
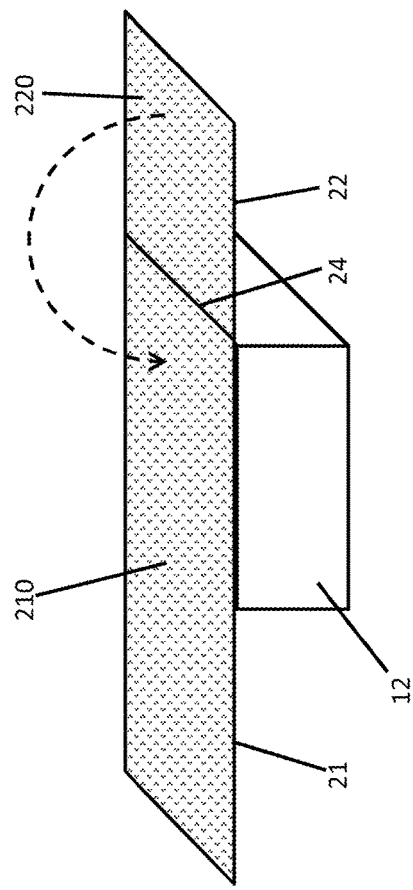
FIG. 3 is a perspective view of an intermediate stage of a bonding preparation method in accordance with embodiments.
Figure 5:
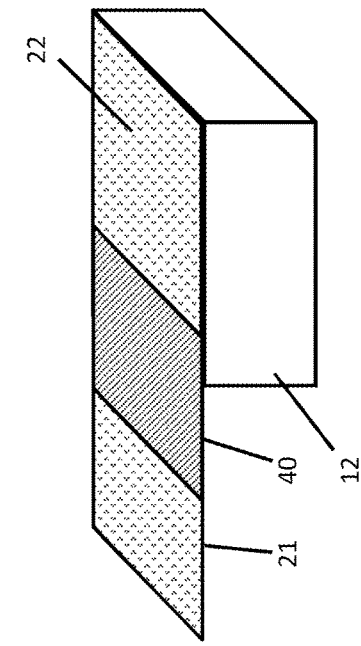
FIG. 5 is a perspective view of an intermediate stage of a bonding preparation method in accordance with embodiments.

The tape 40 may be formed of flouro peel tape or another similar material and includes at least one adhesive side 41 (see FIG. 1). This adhesive side 41 is securable relative to the first portion 21 and is disposable in contact with the second side 221 of the second portion 22. In accordance with embodiments, the adhesive side 41 adhesively contacts the second side 221 of the second portion 22, an exposed portion 31 of the resin barrier 30 and an exposed portion 25 of the first side 211 of the first portion 21. In accordance with alternative embodiments, the adhesive side 41 contacts with another laminate feature, such as a second layer of tape, which in turn contacts the first side of the first portion 21. Edges of the tape 40 may be flush with corresponding edges of the strip 20 as shown in FIG. 5 however this is not necessary and, in some embodiments, the edges of the tape 40 extend beyond the edges of the strip 20 or terminate short of the edges of the strip 20.

With the strip 20 being folded along the fold 24 such that the respective first sides 210 and 220 of the first and second portions 21 and 22 face each other and with the tape 40 securing the folding, the resin barrier 30 may be disposed proximate to or in an abutting condition with the fold 24. Thus, the resin barrier 30 may occupy an entirety or at least a substantial entirety of the space defined between the respective first sides 210 and 220. In this way, the resin barrier 30 is disposed to prevent all or substantially all of the resin 110 that has seeped or leaked through the first portion 21 from seeping or leaking from the first side 210 of the first portion 21 to any part of the second portion 22.

Figure 7:
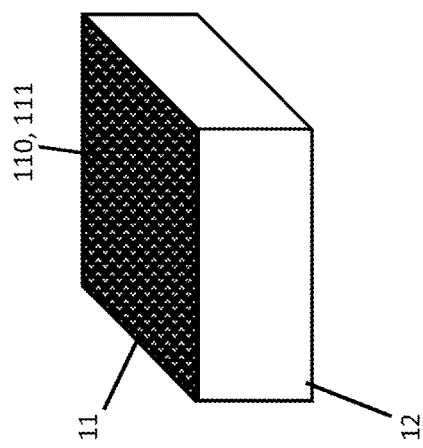
FIG. 7 is a perspective view of a final stage of a bonding preparation method in accordance with embodiments.
Figure 6:
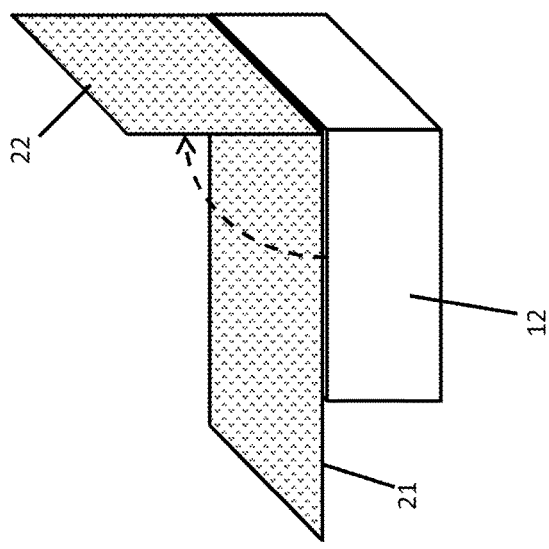
FIG. 6 is a perspective view of an intermediate stage of a bonding preparation method in accordance with embodiments.

Once the patch 10 is formed and applied to the resin treated surface 11 such that the resin 110 seeps or leaks through the first portion 21, the resin 110 is cured. Such curing may be achieved by heat treatment, ultraviolet (UV) radiation treatment or another similar curing treatment. In any case, the resin 110 is cured and thus assumes the negative, reverse or imprinted pattern. At this point, as shown in FIG. 6, the tape 40 is removed, the second portion 22 of the strip 20 is unfolded away from the resin barrier 30 and the resin barrier 30 is removed. Then, as shown in FIG. 7, the strip 20 is removed, pulled or lifted off of the resin treated surface 11 by a pulling force being applied to the second portion 22 to thus reveal the cured resin 110 and its imprinted matte finish pattern 111. This imprinted matte finish pattern 111 provides for a surface that is prepared for bonding and needs no further curing or machining in order to enhance the bonding ability of whatever glue or bonding material may be used to subsequently attach clips or other holding devices thereto.

In accordance with embodiments, the material 23 of the strip 20 is selective to have a sufficient tensile strength to resist tearing of the strip 20 upon separation of the strip 20 from the resin treated surface 11 as a result of the pulling force being applied to the second portion 22.

Figure 8:
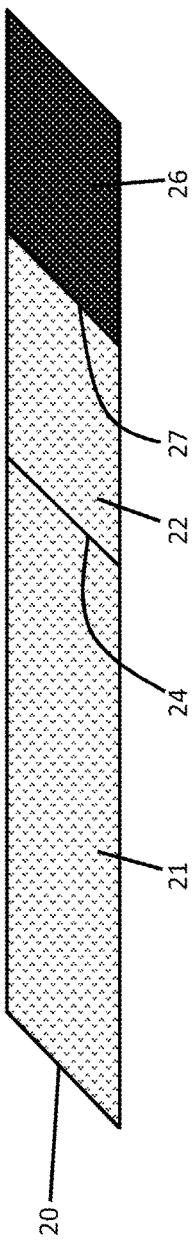
FIG. 8 is a perspective view of a portion of the bonding preparation patch of FIG. 1 in accordance with alternative embodiments.

With reference to FIG. 8 and, in accordance with alternative embodiments, the resin barrier 30 may be provided as a part or component of the strip 20. In this case, the strip 20 may include the first portion 21, the second portion 22 and a third portion 26, which are arranged with the second portion 22 being sandwiched between the first and third portions 21 and 26. The third portion 26 is coated with FEP to provide for the resin barrier and the strip 20 is foldable twice along fold 24 and secondary fold 27 such that the third portion 26 ends up disposed between the first and second portions 21 and 22.

Figure 10:
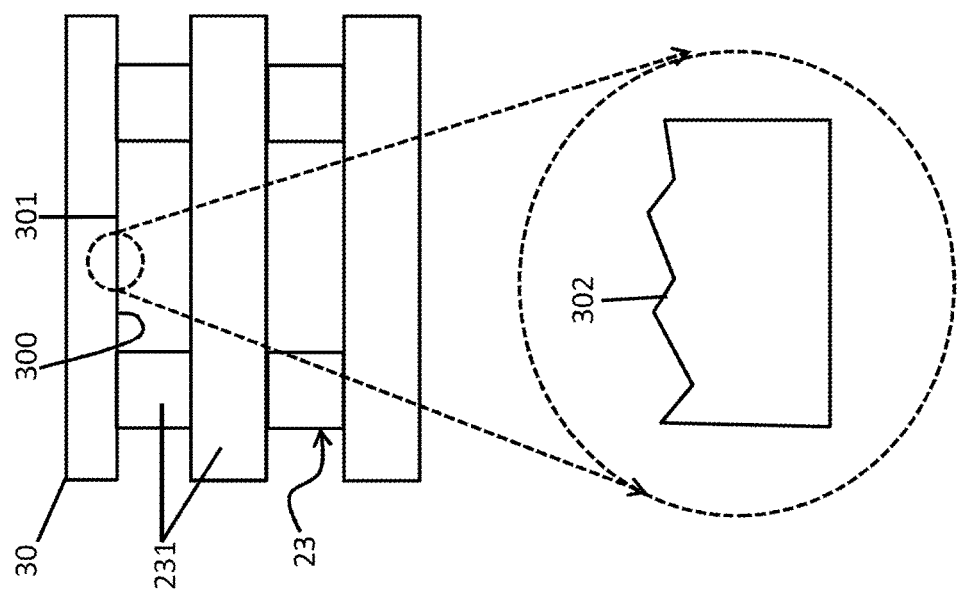
FIG. 10 is a side view of the resin barrier and strip material of FIG. 9.
Figure 9:
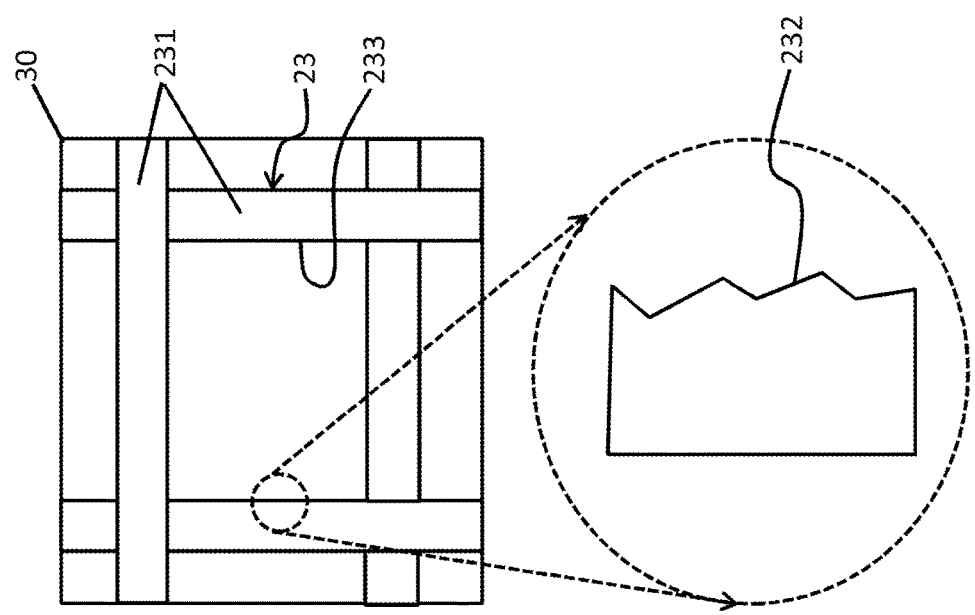
FIG. 9 is a top down view of a resin barrier and strip material in accordance with embodiments.

In accordance with further embodiments and, with reference to FIGS. 9 and 10, the material 23 of the strip 20 is configured to provide the resin treated surface 11, once cured, with a characteristic bondability value of at least 10 inch-pounds/inch of width or, more particularly, at least 13.6 inch-pounds/inch of width. This can be achieved by the formation/imprinting of the desired pattern on the resin treated surface 11. It may also be achieved by an additional mechanical and/or chemical embossment or modification of the resin treated surface 11 by the individual lines or threads 231 of the material 23. That is, the threads 231 may be disposed with a surface roughness 232 that leaves a corresponding roughness in the sides 233 of the surface features of the resin treated surface 11 as the strip 20 is pulled off of the resin treated surface 11. Similarly, the threads 231 may be coated with a certain chemical that mixes with the resin of the resin treated surface 11 during the above-described processing so that the resulting stickiness or bondability of the resin composite is increased. Similarly, the threads 231 may be made of a certain chemical that mixes with the resin of the resin treated surface 11 during the above-described processing so that the resulting stickiness or bondability of the resin composite is increased.

In accordance with further embodiments and, with continued reference to FIG. 10, a surface 300 of the resin barrier 30 contacts the resin that seeps or leaks through the first portion 21 of the strip 20 from the second side 211 to the first side 210. This surface 300 may be configured in a similar manner as the individual threads 231 of the material 23 to provide for mechanical or chemical embossments or modifications of the resin treated surface 11. That is, the surface 300 may be disposed with a surface roughness 301 that leaves a corresponding roughness in the upper surface 302 of the surface features of the resin treated surface 11 as the strip 20 is pulled off of the resin treated surface 11. Similarly, the surface 300 may be coated with a certain chemical that mixes with the resin of the resin treated surface 11 during the above-described processing so that the resulting stickiness or bondability of the resin composite is increased. Similarly, the surface 300 may be made of a certain chemical that mixes with the resin of the resin treated surface 11 during the above-described processing so that the resulting stickiness or bondability of the resin composite is increased.

In general, resin barrier 30 may not have sufficient tensile strength to resist tearing of the strip 20 upon separation of the strip 20 from the resin treated surface 11 as a result of the pulling force being applied to the second portion 22. That strength is provided by the strip 20. As a result, if the entire strip 20 were coated with a resin barrier and then folded once (along 24, for instance), the portion of the strip 20 that was remote from the resin would be easily separated (since there is resin barrier in contact with resin barrier) and act as a pull-tab. Such a pull tab would be of sufficient tensile strength to resist the tearing of the strip 20 upon separation of the strip 20 from the resin treated surface 11 as a result of the pulling force being applied to the second portion 22.

In accordance with further embodiments, it will be understood that the strip 20, the resin barrier 30 and the tap 40 can all be printed in three dimensions (3D printed). That is, digital representations of these features can be provided in a format that is readable by a given 3D printer. Thus, when the digital representation are input into and acted upon by the 3D printer, the digital representations are read by the 3D printer and cause the 3D printer to 3D print the strip 20, the resin barrier 30 and the tape 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A bonding preparation patch for application to a resin treated surface,
the patch comprising:
a strip having first and second portions, each of which has corresponding first and second sides, the strip being:
formed of resin porous material, and
foldable such that the respective first sides of the first and second portions face each other;
a resin barrier interposable between corresponding portions of the respective first sides; and
a tape including at least one adhesive side, which is securable relative to the first portion and disposable in contact with the second side of the second portion.

2. The patch according to claim 1, wherein the resin porous material has a sufficient tensile strength to resist tearing upon separation from the resin treated surface.

3. The patch according to claim 1, wherein the resin porous material is patterned as a negative of a desired pattern of surface features of the resin treated surface.

4. The patch according to claim 3, wherein the resin porous material is configured to modify the surface features of the resin treated surface to have a bondability value of at least 10 inch-pounds/inch of width.

5. The patch according to claim 3, wherein the resin porous material is patterned to mechanically modify the surface features of the resin treated surface.

6. The patch according to claim 3, wherein the resin porous material is configured to chemically modify the resin treated surface.

7. The patch according to claim 1, wherein the resin porous material comprises woven material.

8. The patch according to claim 1, wherein the resin barrier is flush with edges of the strip.

9. The patch according to claim 1, wherein the resin barrier comprises a non-bonding film material that forms a resin barrier.

10. The patch according to claim 1, wherein the resin barrier comprises a third portion of the strip.

11. The bonding preparation patch according to claim 1, wherein at least one adhesive side is disposable to contact the first side of the first portion.

12. The bonding preparation patch according to claim 1, further comprising digital representations formatted to be readable by a 3D printer, which, when acted upon by the 3D printer, cause the 3D printer to 3D print the strip, the resin barrier and the tape.

* * * * *